United States Patent
Suzuki et al.

(10) Patent No.: US 12,466,470 B2
(45) Date of Patent: Nov. 11, 2025

(54) TURNING METHOD AND TURNING DEVICE

(71) Applicant: Nissan Motor Co., Ltd., Kanagawa (JP)

(72) Inventors: Taku Suzuki, Kanagawa (JP); Tomoaki Oida, Kanagawa (JP); Yuki Miyashita, Kanagawa (JP); Yuta Kaneko, Kanagawa (JP); Noriki Kubokawa, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 434 days.

(21) Appl. No.: 18/044,939

(22) PCT Filed: Oct. 9, 2020

(86) PCT No.: PCT/JP2020/038306
§ 371 (c)(1),
(2) Date: Mar. 10, 2023

(87) PCT Pub. No.: WO2022/074826
PCT Pub. Date: Apr. 14, 2022

(65) Prior Publication Data
US 2023/0286573 A1    Sep. 14, 2023

(51) Int. Cl.
*B62D 5/04*     (2006.01)
*B62D 6/00*     (2006.01)
*B62D 15/02*    (2006.01)

(52) U.S. Cl.
CPC ............ *B62D 5/0463* (2013.01); *B62D 6/00* (2013.01); *B62D 15/021* (2013.01)

(58) Field of Classification Search
None
See application file for complete search history.

(56) References Cited

FOREIGN PATENT DOCUMENTS

| JP | 2005067395 A | 3/2005 |
| JP | 2010149650 A | 7/2010 |
| JP | 2019043391 A | 3/2019 |
| JP | 2020037370 A | 3/2020 |

*Primary Examiner* — Jason D Shanske
*Assistant Examiner* — Scott Lawrence Strickler
(74) *Attorney, Agent, or Firm* — Osha Bergman Watanabe & Burton LLP

(57) ABSTRACT

A turning method for turning a steered wheel of a vehicle includes detecting a steering angle of a steering wheel; detecting an actual turning angle. The actual turning angle is an actual turning angle of the steered wheel. The method includes calculating a target turning angle of the steered wheel according to the detected steering angle. The method includes calculating a turning force command value to cause the actual turning angle to coincide with the target turning angle, based on a difference between the actual turning angle and the target turning angle. The method includes delaying a phase of the turning force command value with respect to the detected steering angle; and generating turning force to turn the steered wheel in accordance with the turning force command value having a phase delayed.

10 Claims, 13 Drawing Sheets

TURNING METHOD AND TURNING DEVICE

TECHNICAL FIELD

The present invention relates to a turning method and a turning device.

BACKGROUND ART

In PTL 1, a steering angle control device including a steering member to steer a vehicle and a turning device to turn wheels and configured to calculate a turning angle according to a steering angle and control a turning actuator based on the calculated turning angle is described.

CITATION LIST

Patent Literature

PTL: JP 2019-43391 A

SUMMARY OF INVENTION

Technical Problem

When a target turning angle is set according to a steering angle of a steering wheel steered by a driver and turning force based on a difference between an actual turning angle that is an actual turning angle of steered wheels and the target turning angle is generated, a response of vehicle behavior to steering operation by the driver becomes fast and the driver has a feeling of uneasiness in some cases.

An object of the present invention is to, in a turning device turning steered wheels by turning force based on a difference between an actual turning angle and a target turning angle, reduce a feeling of uneasiness for a driver due to a fast response of vehicle behavior with respect to steering operation.

Solution to Problem

According to an aspect of the present invention, there is provided a turning method for turning a steered wheel of a vehicle including: detecting a steering angle of a steering wheel; detecting an actual turning angle, the actual turning angle being an actual turning angle of the steered wheel; calculating a target turning angle of the steered wheel according to the detected steering angle; calculating a turning force command value to cause the actual turning angle to coincide with the target turning angle, based on a difference between the actual turning angle and the target turning angle; delaying a phase of the turning force command value with respect to the detected steering angle; and generating turning force to turn the steered wheel in accordance with the turning force command value having a phase delayed.

Advantageous Effects of Invention

According to the present invention, it is possible to, in a turning device turning steered wheels by turning force based on a difference between an actual turning angle and a target turning angle, reduce a feeling of uneasiness for a driver due to a fast response of vehicle behavior with respect to steering operation.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENTS

Hereinafter, the embodiments of the present disclosure will be described with reference to the drawings. Each drawing is schematic, and may differ from the reality. The following embodiments of the present disclosure are examples of devices and methods for embodying the technological idea of the present disclosure, and the technological idea of the present disclosure does not limit the structure, arrangement and the like of the components to the following ones. The technological idea of the present disclosure may be modified in various ways within the technological scope defined by the claims.

First Embodiment (Configuration)

Figure 1A:
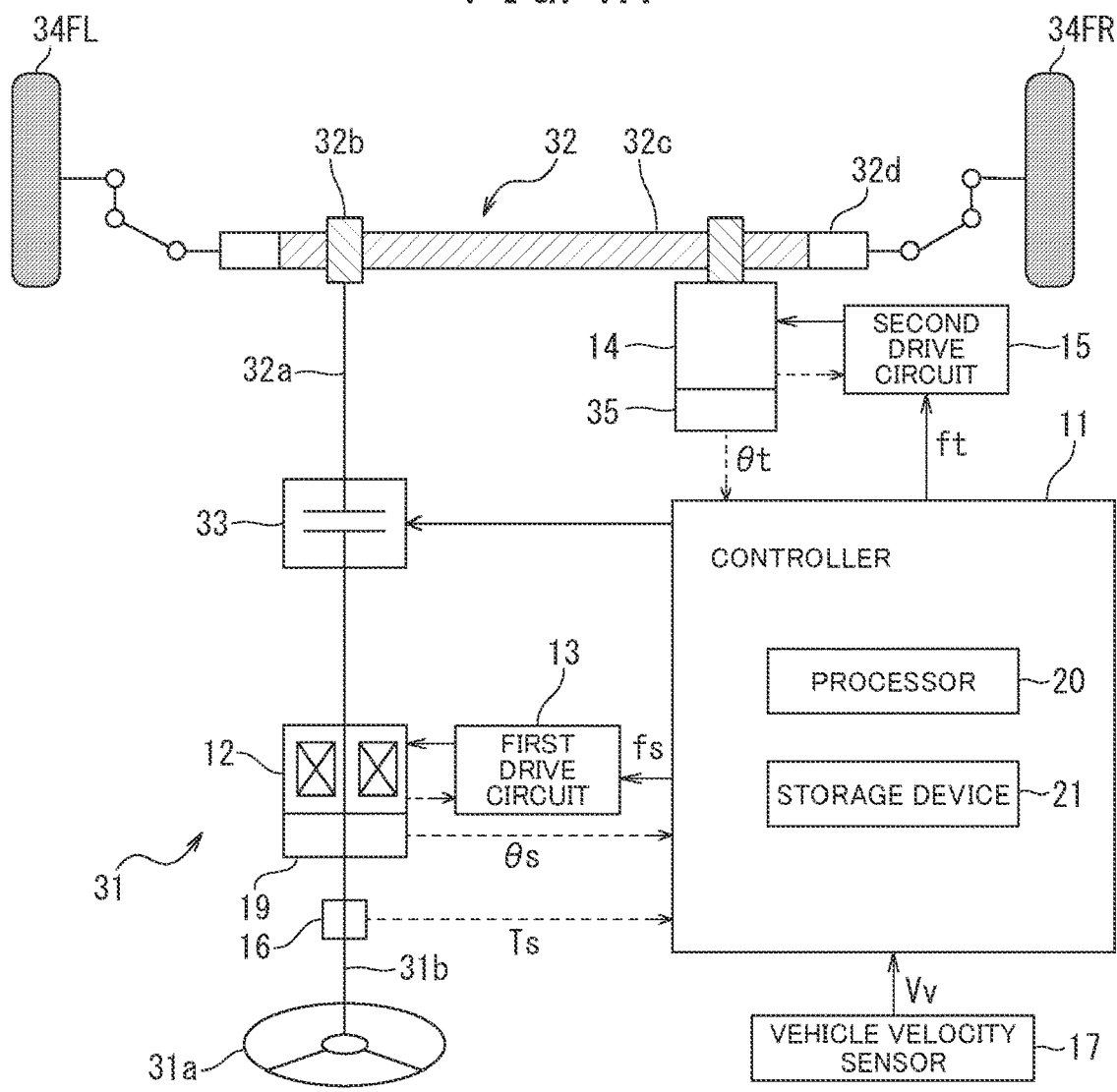
FIG. 1A is a schematic configuration diagram of an example of a turning device of embodiments.

FIG. 1A is a schematic configuration diagram of an example of a turning device of a vehicle in first to fourth embodiments. Each of the turning devices in the embodiments includes a steering unit 31 configured to accept steering input from a driver, a turning unit 32 configured to turn left and right front wheels 34FL and 34FR that are steered wheels, a backup clutch 33, and a controller 11.

This steering device employs a steer-by-wire (SBW) system in which bringing the backup clutch 33 into a released state causes the steering unit 31 and the turning unit 32 to be mechanically separated from each other. In the following description, the left and right front wheels 34FL and 34FR are sometimes referred to as "steered wheels 34".

The steering unit 31 includes a steering wheel 31a, a column shaft 31b, a reaction force actuator 12, a first drive circuit 13, a torque sensor 16, and a steering angle sensor 19.

On the other hand, the turning unit 32 includes a pinion shaft 32a, a steering gear 32b, a rack gear 32c, a steering rack 32d, a turning actuator 14, a second drive circuit 15, and a turning angle sensor 35.

The steering wheel 31a of the steering unit 31 is provided with reaction torque by the reaction force actuator 12 and also receives input of steering torque provided by the driver and rotates. Note that, in the description of the present invention, reaction torque provided to the steering wheel by an actuator is sometimes referred to as "steering reaction torque".

The column shaft 31b rotates integrally with the steering wheel 31a.

On the other hand, the steering gear 32b of the turning unit 32 meshes with the rack gear 32c and turns the steered wheels 34 in accordance with the rotation of the pinion shaft 32a. As the steering gear 32b, for example, a steering gear of a rack and pinion type or the like may be employed.

The backup clutch 33 is disposed between the column shaft 31b and the pinion shaft 32a. The backup clutch 33 mechanically separates the steering unit 31 and the turning unit 32 from each other when being brought into the released state and mechanically connects the steering unit 31 and the turning unit 32 to each other when being brought into an engaged state. Note that the backup clutch 33 is configured to be in the released state at normal times, such as when the vehicle is traveling and when an ignition switch is in the on state, and to be brought into the engaged state in the case where some abnormality, such as an abnormality in the turning actuator 14 or the reaction force actuator 12, occurs to the system or when the ignition switch of the vehicle is kept off (for example, at the time of parking), and is normally put in the released state. Thus, the following description will be made assuming that the backup clutch 33 is in the released state and the steering wheel 31a and the turning unit 32 are mechanically separated from each other.

The torque sensor 16 detects steering torque Ts that is transmitted from the steering wheel 31a to the column shaft 31b.

The vehicle velocity sensor 17 detects wheel speed of the vehicle on which the turning device of the embodiments is mounted and calculates vehicle velocity Vv of the vehicle, based on the wheel speed.

The steering angle sensor 19 detects a column shaft rotation angle, that is, a steering angle θs (steering wheel angle) of the steering wheel 31a.

The turning angle sensor 35 detects an actual turning angle θt that is an actual turning angle of the steered wheels 34.

The controller 11 is an electronic control unit (ECU) that performs turning control of the steered wheels and reaction force control of the steering wheel. In the description of the present invention, the "reaction force control" means control of steering reaction torque that is provided to the steering wheel 31a by an actuator, such as the reaction force actuator 12. The controller 11 includes a processor 20 and a peripheral component, such as a storage device 21. The processor 20 may be, for example, a central processing unit (CPU) or a micro-processing unit (MPU).

The storage device 21 may include a semiconductor storage device, a magnetic storage device, and an optical storage device. The storage device 21 may include a memory, such as a read only memory (ROM) and a random access memory (RAM), that is used as registers, a cache memory, or a main storage device.

Note that the controller 11 may be achieved by functional logic circuits that are set in a general-purpose semiconductor integrated circuit. For example, the controller 11 may have a programmable logic device (PLD), such as a field-programmable gate array (FPGA).

Figure 1B:
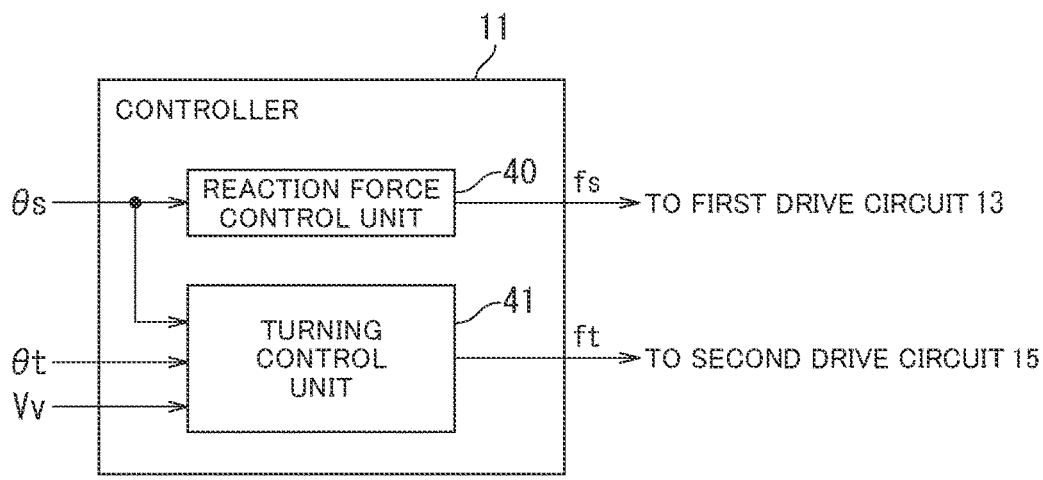
FIG. 1B is a block diagram of an example of a functional configuration of a controller illustrated in FIG. 1A.

FIG. 1B is a block diagram illustrative of an example of a functional configuration of the controller 11. The controller 11 includes a reaction force control unit 40 and a turning control unit 41. Functions of the reaction force control unit 40 and the turning control unit 41 may be achieved by, for example, the processor 20 executing computer programs stored in the storage device 21 of the controller 11.

The reaction force control unit 40 calculates a reaction force command value fs that is a command value of steering reaction torque (rotational torque to be provided to the steering wheel 31a, and, hereinafter, also referred to as reaction torque) to be provided to the steering wheel, according to the steering angle θs that the steering angle sensor 19 detected.

The reaction force control unit 40 outputs the reaction force command value fs to the first drive circuit 13. The first drive circuit 13 drives the reaction force actuator 12, based on the reaction force command value fs.

The reaction force actuator 12 may be, for example, an electric motor. The reaction force actuator 12 has an output shaft that is arranged coaxially with the column shaft 31b.

The reaction force actuator 12 outputs rotational torque that is to be provided to the steering wheel 31*a* to the column shaft 31*b* in accordance with command current output from the first drive circuit 13. The reaction force actuator 12, by providing rotational torque, generates steering reaction torque on the steering wheel 31*a*.

The first drive circuit 13 controls the command current that is to be output to the reaction force actuator 12 by torque feedback that causes actual steering reaction torque estimated from driving current of the reaction force actuator 12 to coincide with reaction torque that the reaction force command value fs output from the reaction force control unit 40 indicates. Alternatively, the first drive circuit 13 may control the command current that is to be output to the reaction force actuator 12 by current feedback that causes driving current of the reaction force actuator 12 to coincide with driving current equivalent to the reaction force command value fs.

The turning control unit 41 calculates a turning force command value ft that is a command value of turning force torque turning the steered wheels 34, based on the steering angle θs of the steering wheel 31*a*, the actual turning angle θt of the steered wheels 34, and the vehicle velocity Vv of the vehicle.

Specifically, the turning control unit 41 calculates a target turning angle θtr that is a target value of the turning angle of the steered wheels 34, based on the steering angle θs.

The turning control unit 41 may change an angle ratio Ra=θtr/θs that is a ratio of the target turning angle θtr to the steering angle θs according to at least the vehicle velocity Vv. For example, when the vehicle velocity Vv is low, the angle ratio Ra may be set to a comparatively large value to improve handleability of the steering wheel 31*a*, and, when the vehicle velocity Vv is high, the angle ratio Ra may be set to a comparatively small value to improve steering stability.

The turning control unit 41 calculates a turning force command value ft to cause the actual turning angle θt to coincide with the target turning angle θtr, based on a difference (θtr−θt) between the actual turning angle θt and the target turning angle θtr. The turning force command value ft is calculated in such a manner that the larger the difference (θtr−θt) between the actual turning angle θt and the target turning angle θtr is, the larger the turning force command value ft becomes. The turning force command value ft is calculated by, for example, multiplying the difference (θtr−θt) between the actual turning angle θt and the target turning angle θtr by a predetermined prescribed gain. Alternatively, differences (θtr−θt) between actual turning angles θt and target turning angles θtr and turning force command values ft corresponding thereto may be stored in advance as a turning force map, and a turning force command value ft may be calculated by referring to the turning force map, based on a calculated difference (θtr−θt).

The turning control unit 41 outputs the turning force command value ft to the second drive circuit 15. The second drive circuit 15 drives the turning actuator 14, based on the turning force command value ft.

The turning actuator 14 may be an electric motor, such as a brushless motor. An output shaft of the turning actuator 14 is connected to the rack gear 32*c* via a speed reducer.

The turning actuator 14 outputs turning torque to turn the steered wheels 34 to the steering rack 32*d* in accordance with command current output from the second drive circuit 15.

The second drive circuit 15 controls the command current that is to be output to the turning actuator 14 by torque feedback that causes actual turning torque estimated from driving current of the turning actuator 14 to coincide with turning torque that the turning force command value ft output from the turning control unit 41 indicates. Alternatively, the second drive circuit 15 may control the command current that is to be output to the turning actuator 14 by current feedback that causes driving current of the turning actuator 14 to coincide with driving current equivalent to the turning force command value ft.

When turning force that causes the actual turning angle θt to coincide with the target turning angle θtr is generated based on a difference (θtr−θt) between the actual turning angle θt and the target turning angle θtr as described above, a response of vehicle behavior to steering operation by the driver becomes fast and the driver has a feeling of uneasiness in some cases. The reason for the inconvenience will be described with reference to FIGS. 2A to 2E.

Figure 2A:
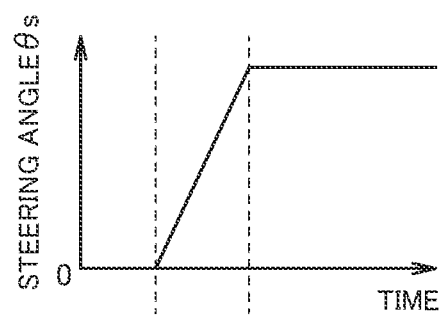
FIG. 2A is a schematic diagram of an example of temporal change of a steering angle.
Figure 2B:
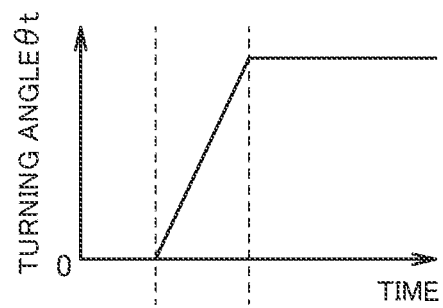
FIG. 2B is a schematic diagram of a turning angle according to the steering angle in FIG. 2A.
Figure 2C:
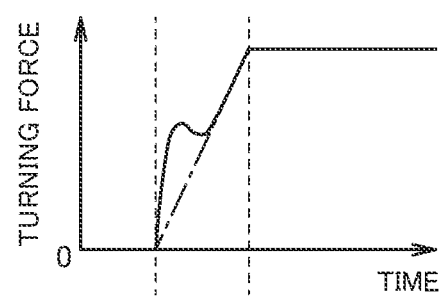
FIG. 2C is a schematic diagram of turning force to generate a turning angle change in FIG. 2B.
Figure 2D:
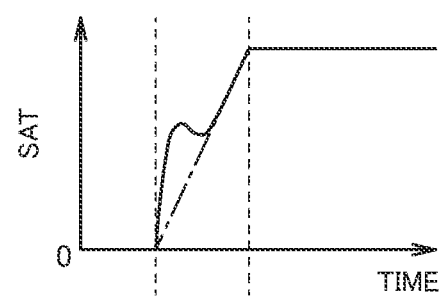
FIG. 2D is a schematic diagram of self-aligning torque (SAT) generated by the turning angle change in FIG. 2B.
Figure 2E:
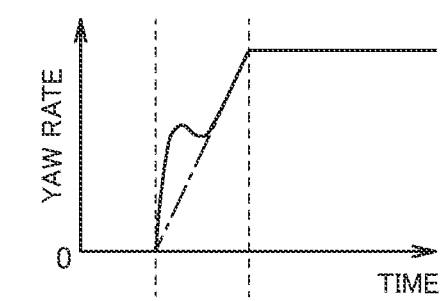
FIG. 2E is a schematic diagram of a yaw rate generated by the turning angle change in FIG. 2B.

FIG. 2A is a schematic diagram of the steering angle θs that changes by steering operation of the driver, FIG. 2B is a schematic diagram of the turning angle θt that changes in accordance with the steering angle θs in FIG. 2A, FIG. 2C is a schematic diagram of turning force to cause the turning angle change in FIG. 2B to be generated, FIG. 2D is a schematic diagram of self-aligning torque (SAT) that is generated by the turning angle change in FIG. 2B, and FIG. 2E is a schematic diagram of a yaw rate that is generated by the turning angle change in FIG. 2B.

The steer-by-wire system performs servo control in such a manner as to cause the target turning angle θtr calculated from the steering angle θs and the actual turning angle θt to coincide with each other. Therefore, phase delay of the turning angle θt with respect to the steering angle θs in the steer-by-wire system is smaller than that in a conventional turning device that transmits steering torque to the steered wheels by coupling of shafts (FIGS. 2A and 2B).

Immediately after start of change in the turning angle θt, an angle difference between the direction of the steered wheels 34 and the traveling direction of the steered wheels 34 becomes large. Thus, when the actual turning angle θt follows the target turning angle θtr with a small delay, lateral force generated in a tire rapidly increases.

Therefore, immediately after the start of change in the turning angle θt, the turning force and the self-aligning torque rapidly increase, as illustrated in FIGS. 2C and 2D.

As a result, as illustrated in FIG. 2E, the yaw rate rapidly increases immediately after the start of change in the turning angle θt, and the vehicle behavior becomes fast with respect to the steering force that the driver applied to the steering wheel 31*a* and the driver has a feeling of uneasiness in some cases.

Thus, the turning control unit 41 of the embodiments delays a phase of the turning force command value ft with respect to the steering angle θs. This configuration enables the turning angle θt to be delayed with respect to the steering angle θs immediately after the start of change in the turning angle θt, as illustrated by a solid line in FIG. 3A.

FIGS. 3A to 3D are schematic diagrams illustrative of, by solid lines, the turning angle θt, the turning force, the SAT, and the yaw rate in the case where the phase of the turning force command value ft is delayed with respect to the steering angle θs illustrated in FIG. 2A, respectively. For a comparison purpose, the turning angle θt, the turning force, the SAT, and the yaw rate in the case where the phase is not delayed are respectively illustrated by dashed-dotted lines.

Figure 3A:
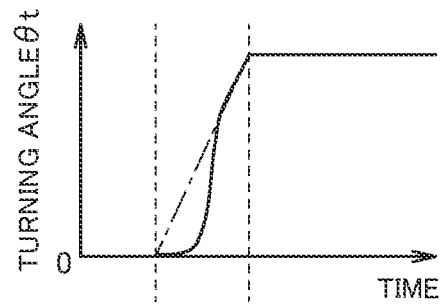
FIG. 3A is a schematic diagram of the turning angle in the case where a phase is delayed with respect to the steering angle in FIG. 2A.
Figure 3B:
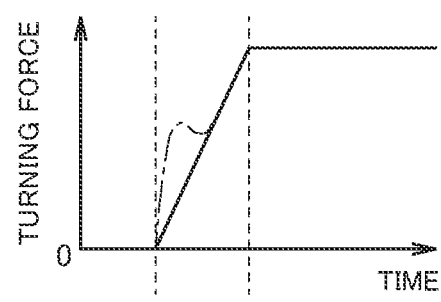
FIG. 3B is a schematic diagram of turning force to generate a turning angle change in FIG. 3A.
Figure 3C:
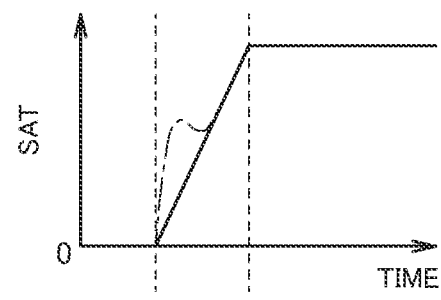
FIG. 3C is a schematic diagram of SAT generated by the turning angle change in FIG. 3A.
Figure 3D:
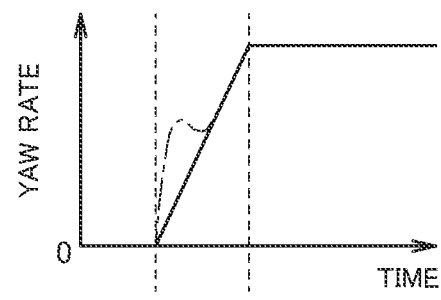
FIG. 3D is a schematic diagram of a yaw rate generated by the turning angle change in FIG. 3A.

The turning angle θt being delayed as illustrated in FIG. 3A as a result of delaying the phase of the turning force command value ft enables the turning force, the SAT, and the yaw rate to gradually change. Therefore, it is possible to prevent the vehicle behavior from becoming fast with respect to the steering force that the driver applies and reduce a feeling of uneasiness that the driver has.

The turning control unit 41 will be further described below.

Figure 4:
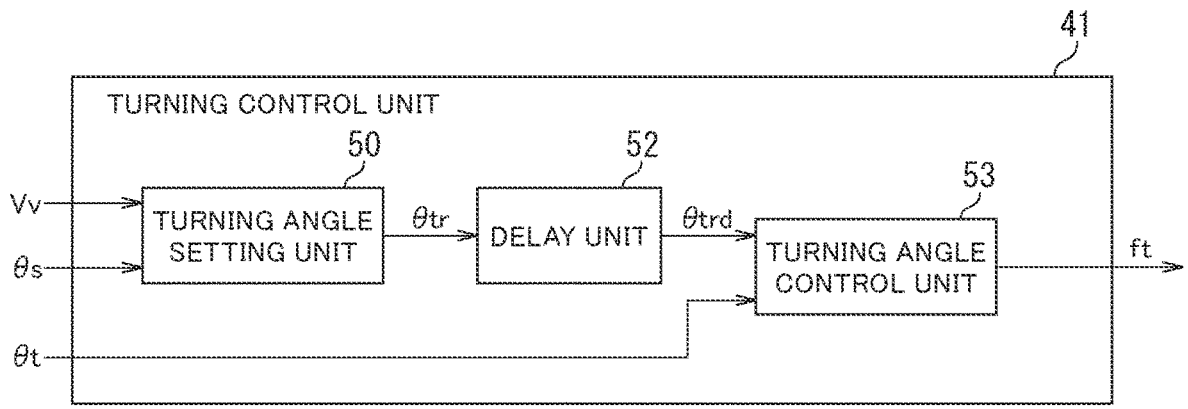
FIG. 4 is a block diagram of an example of a functional configuration of a turning control unit of a first embodiment.

FIG. 4 is a block diagram of an example of a functional configuration of the turning control unit 41 of the first embodiment. The turning control unit 41 includes a turning angle setting unit 50, a delay unit 52, and a turning angle control unit 53.

The turning angle setting unit 50 calculates the target turning angle θtr according to the steering angle θs. For example, the turning angle setting unit 50 calculates the target turning angle θtr by multiplying the steering angle θs by the angle ratio Ra.

The turning angle setting unit 50 may dynamically change the angle ratio Ra. For example, the turning angle setting unit 50 may change the angle ratio Ra at least according to the vehicle velocity Vv.

For example, when the vehicle velocity Vv is low, the angle ratio Ra may be set to a comparatively large value to improve handleability of the steering wheel 31a, and, when the vehicle velocity Vv is high, the angle ratio Ra may be set to a comparatively small value to improve turning stability.

Alternatively, steering angles θs and target turning angles θtr corresponding thereto may be stored in advance as a turning angle map, and a target turning angle θtr may be calculated by referring to the turning angle map, based on a detected actual steering angle θs. In addition, by storing a plurality of turning angle maps according to the vehicle velocity Vv, a relationship of the target turning angle θtr with respect to the steering angle θs may be changed according to the vehicle velocity Vv.

The turning angle setting unit 50 outputs the target turning angle θtr to the delay unit 52. The delay unit 52 delays the phase of the target turning angle θtr that the turning angle setting unit 50 outputs. The delay unit 52 outputs the target turning angle θtrd having a phase delayed to the turning angle control unit 53.

The turning angle control unit 53 calculates, based on a difference between the target turning angle θtrd having a phase delayed and the actual turning angle θt, the turning force command value ft to cause the actual turning angle θt to coincide with the target turning angle θtrd.

As described above, the delay unit (delay means) 52, by delaying the phase of the target turning angle θtr, delays the phase of the turning force command value ft that the turning angle control unit 53 calculates with respect to the steering angle θs.

The delay unit 52 may be, for example, a phase delay filter (delay filter) that delays the phase of an input signal. In addition, the amount of delay of a phase in the delay unit 52 may be set in advance through experiment or the like.

In addition, the delay unit 52 may delay the phase of the target turning angle θtr by outputting a signal obtained by adding an integral term of the target turning angle θtr to a proportional term of the target turning angle θtr as in the second embodiment, which will be described later.

(Operation)

Next, an example of a turning method of the first embodiment will be described with reference to FIG. 5.

In step S1, the steering angle sensor 19 detects the steering angle θs of the steering wheel 31a.

In step S2, the turning angle sensor 35 detects the actual turning angle θt of the steered wheels 34.

In step S3, the turning angle setting unit 50 calculates the target turning angle θtr according to the steering angle θs.

In step S4, the delay unit 52 delays the phase of the target turning angle θtr that the turning angle setting unit 50 outputs.

In step S5, the turning angle control unit 53 calculates the turning force command value ft, based on a difference between the target turning angle θtrd having a phase delayed and the actual turning angle θt.

In step S6, the second drive circuit 15 drives the turning actuator 14, based on the turning force command value ft.

(Advantageous Effects of First Embodiment)

(1) The steering angle sensor 19 detects the steering angle θs of the steering wheel 31a. The turning angle sensor 35 detects the actual turning angle θt of the steered wheels 34. The turning angle setting unit 50 calculates the target turning angle θtr according to the steering angle θs. The delay unit 52 delays the phase of the target turning angle θtr with respect to the steering angle θs.

The turning angle control unit 53 calculates, based on a difference between the target turning angle θtrd having a phase delayed and the actual turning angle θt, the turning force command value ft to cause the actual turning angle θt to coincide with the target turning angle θtrd. Thus, the phase of the turning force command value ft is delayed with respect to the steering angle θs. The second drive circuit 15 and the turning actuator 14 generate turning force to turn the steered wheels 34 in accordance with the turning force command value ft having a phase delayed.

This configuration enables a feeling of uneasiness that the driver may have due to fast response of vehicle behavior to steering operation to be reduced.

(2) The phase of the turning force command value ft may be delayed with respect to the steering angle θs by delaying the phase of the target turning angle θtr calculated according to the steering angle θs. This configuration enables a response of the vehicle behavior to the steering force that the driver applies to be prevented from becoming fast and a feeling of uneasiness that the driver has to be reduced.

(3) The delay unit 52 may be a delay filter. This configuration enables the phase of the turning force command value ft to be delayed with respect to the steering angle θs.

Second Embodiment

In the second embodiment, an example of a delay unit 52 of a turning control unit 41 will be presented. The delay unit 52 of the second embodiment, by adding an integral term of a target turning angle θtr that a turning angle setting unit 50 set to a proportional term of the target turning angle θtr, delays a phase of the target turning angle θtr.

Figure 6A:
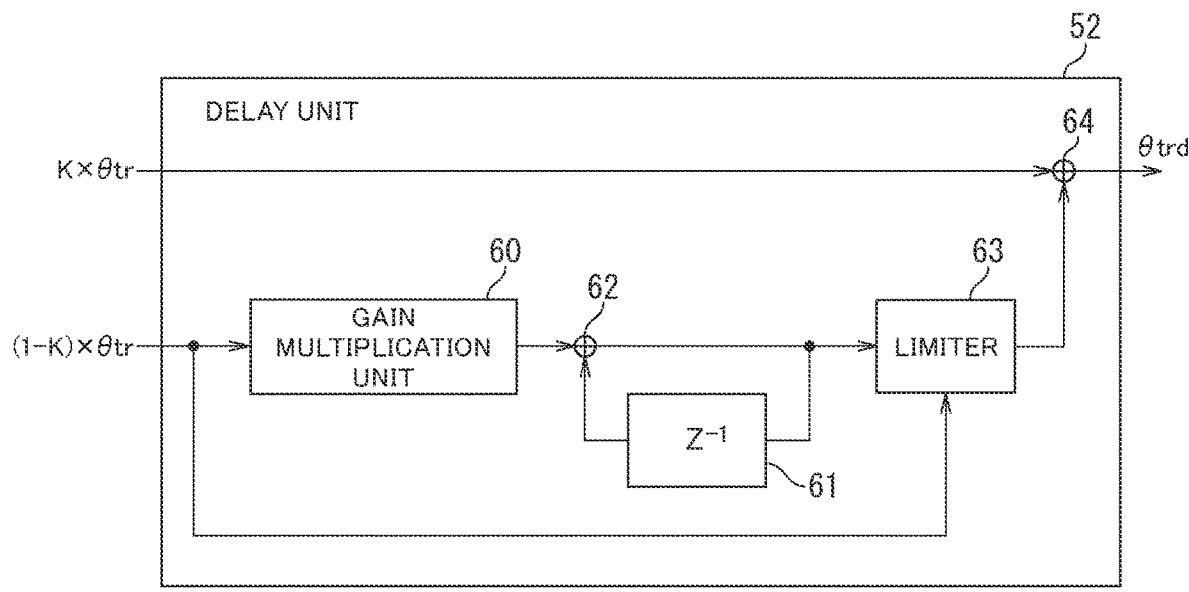
FIG. 6A is a block diagram of an example of a functional configuration of a delay unit of a second embodiment.

FIG. 6A is now referred to. The delay unit 52 includes a gain multiplication unit 60, a delay element 61, an adders 62 and 64, and a limiter 63.

The target turning angle θtr that the turning angle setting unit 50 set is allocated, by allocation coefficients K and (1−K), into K×θtr and (1−K)×θtr. In the above allocation, K is a coefficient greater than 0 and less than 1 and may, for example, have a value of 0.5. In this case, the target turning angle θtr is equally divided. The allocation coefficient K may have a value other than 0.5 and may be appropriately set according to the desired amount of delay.

The turning angle setting unit 50 may, by multiplying the target turning angle θtr by the allocation coefficients K and (1−K), allocate the target turning angle θtr into K×θtr and (1−K)×θtr, respectively. In addition, for example, the turning angle setting unit 50 may output the target turning angle θtr to the delay unit 52 and the delay unit 52 may, by multiplying the target turning angle θtr by gains K and (1−K), allocate the target turning angle θtr into K×θtr and (1−K)×θtr, respectively. Hereinafter, K×θtr and (1−K)×θtr are referred to as "allocated target turning angles".

The gain multiplication unit 60 multiplies the allocated target turning angle (1−K)×θtr by an integral gain Ki and outputs a multiplication result.

The delay element 61 holds past values of the integral value of output (Ki×(1−K)×θtr) from the gain multiplication unit 60.

The adder 62, by adding an output (Ki×(1−K)×θtr) from the gain multiplication unit 60 to the past values of the integral value, integrates the output (Ki×(1−K)×θtr).

In this processing, a coefficient Ki×(1−K) can be considered as an integral gain. Therefore, the integral value of the output (Ki×(1−K)×θtr) that is integrated by the adder 62 can be considered as an integral term of the target turning angle θtr.

The limiter 63 limits the magnitude (that is, the absolute value) of the integral term of the target turning angle θtr to a limit value or less.

For example, the limiter 63 may limit, by a limit value that changes according to the target turning angle θtr, the magnitude (that is, the absolute value) of the integral term of the target turning angle θtr to the limit value or less.

Figure 6B:
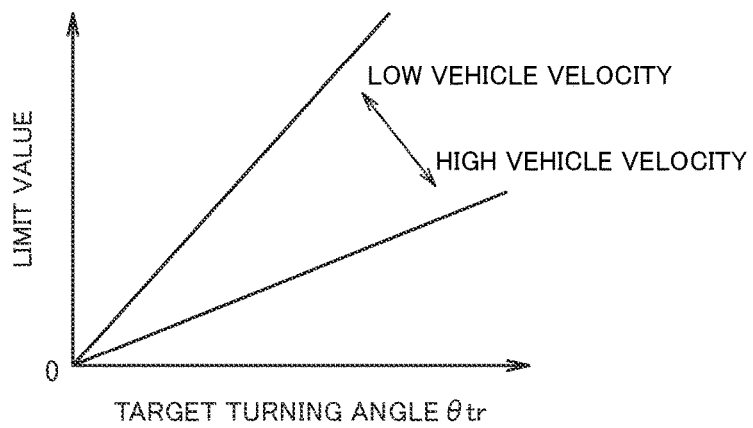
FIG. 6B is an explanatory diagram of an example of limit values of a limiter in FIG. 6A.

FIG. 6B is now referred to. The larger the target turning angle θtr is, the larger value the limit value has. As with the target turning angle θtr, the limit value may be changed according to vehicle velocity Vv.

Because of this configuration, even when, in a steering holding state, the target turning angle θtr is maintained at a non-zero angle, it is possible to prevent the integral term of the target turning angle θtr from continuing to increase and fix the output from the delay unit 52 (that is, the target turning angle θtrd having a phase delayed) to an angle matching the target turning angle θtr.

FIG. 6A is now referred to. The adder 64, by adding the integral term of the target turning angle θtr output from the limiter 63 to the allocated target turning angle K×θtr (that is, the proportional term of the target turning angle θtr), calculates the target turning angle θtrd having a phase delayed.

Figure 7:
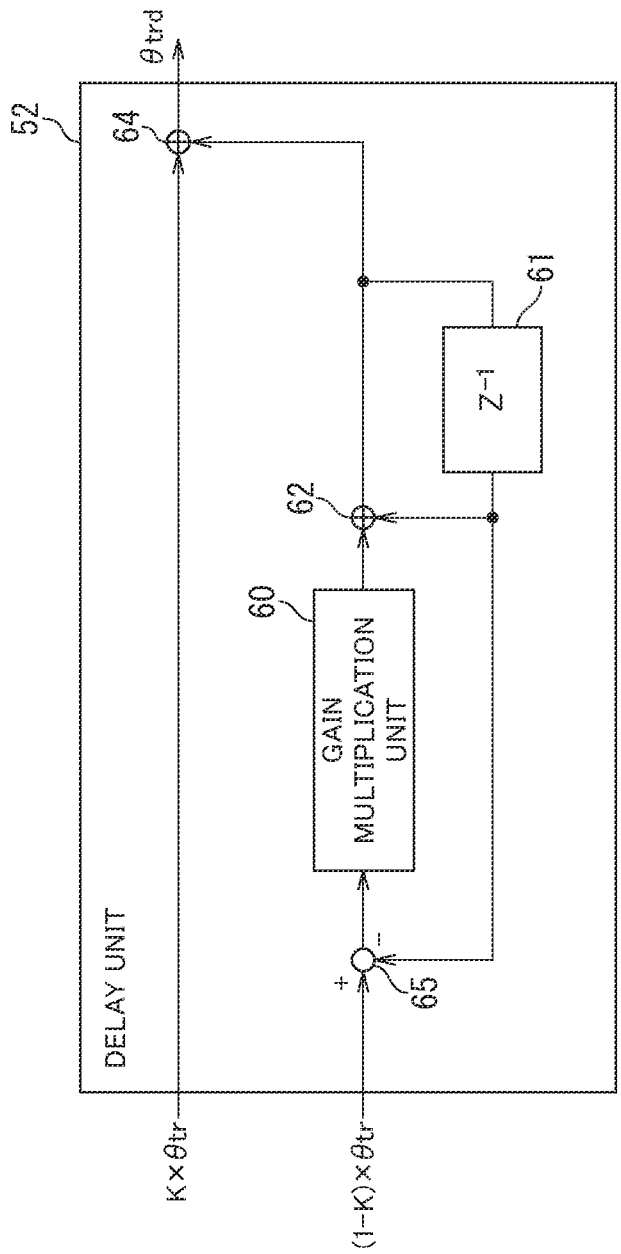
FIG. 7 is a block diagram of an example of a functional configuration of a variation of the delay unit of the second embodiment.

FIG. 7 is a block diagram of an example of a functional configuration of a variation of the delay unit 52 of the second embodiment. The delay unit 52 of the variation includes a subtracter 65. The subtracter 65 inputs a difference obtained by subtracting the past values of the integral value of the output (Ki×(1−K)×θtr) from the gain multiplication unit 60 from the allocated target turning angle (1−K)×θtr to the gain multiplication unit 60.

Thus, when the target turning angle θtr becomes constant (that is, temporal change disappears) and the allocated target turning angle (1−K)×θtr and the integral value of the output (Ki×(1−K)×θtr) from the gain multiplication unit 60 become equal to each other, input to the gain multiplication unit 60 is canceled out and the integral value becomes stable.

Therefore, the gain multiplication unit 60, the delay element 61, the adder 62, and the subtracter 65 calculate an integral term of only a variable component of the target turning angle θtr.

Because of this configuration, even when, in a steering holding state, the target turning angle θtr is maintained at a non-zero angle, it is possible to prevent the integral term of the target turning angle θtr from continuing to increase and fix the output from the delay unit 52 (that is, the target turning angle θtrd having a phase delayed) to an angle matching the target turning angle θtr.

(Advantageous Effects of Second Embodiment)

(1) The delay unit 52 may, by adding an integral term of the target turning angle θtr that is calculated according to the steering angle θs to a proportional term of the target turning angle θtr, delay the phase of the target turning angle θtr. This configuration enables the phase of the turning force command value ft to be delayed with respect to the steering angle θs.

(2) The delay unit 52 may add an integral term calculated by integrating only a variable component of the target turning angle θtr to the proportional term of the target turning angle θtr or may limit an integral term of the target turning angle θtr by a limit value matching the target turning angle θtr and subsequently add the limited integral term to the proportional term of the target turning angle θtr. Because of this configuration, even when, in a steering holding state, the target turning angle θtr is maintained at a non-zero angle, it is possible to prevent the integral term of the target turning angle θtr from continuing to increase and fix the output from the delay unit 52 (that is, the target turning angle θtrd having a phase delayed) to an angle matching the target turning angle θtr.

Third Embodiment

As described above, it is immediately after start of change in an actual turning angle θt that a response of vehicle behavior to steering operation becomes fast. Therefore, it is preferable to delay a phase of a turning force command value ft with respect to a steering angle θs in a period immediately after the start of change in the actual turning angle θt and not to delay the phase of the turning force command value ft in the other period.

Thus, a turning control unit 41 of the third embodiment delays the phase of the turning force command value ft with respect to the steering angle θs when the steering angle θs is less than a predetermined value and does not delay the phase of the turning force command value ft with respect to the steering angle θs when the steering angle θs is greater than or equal to the predetermined value.

Figure 8A:
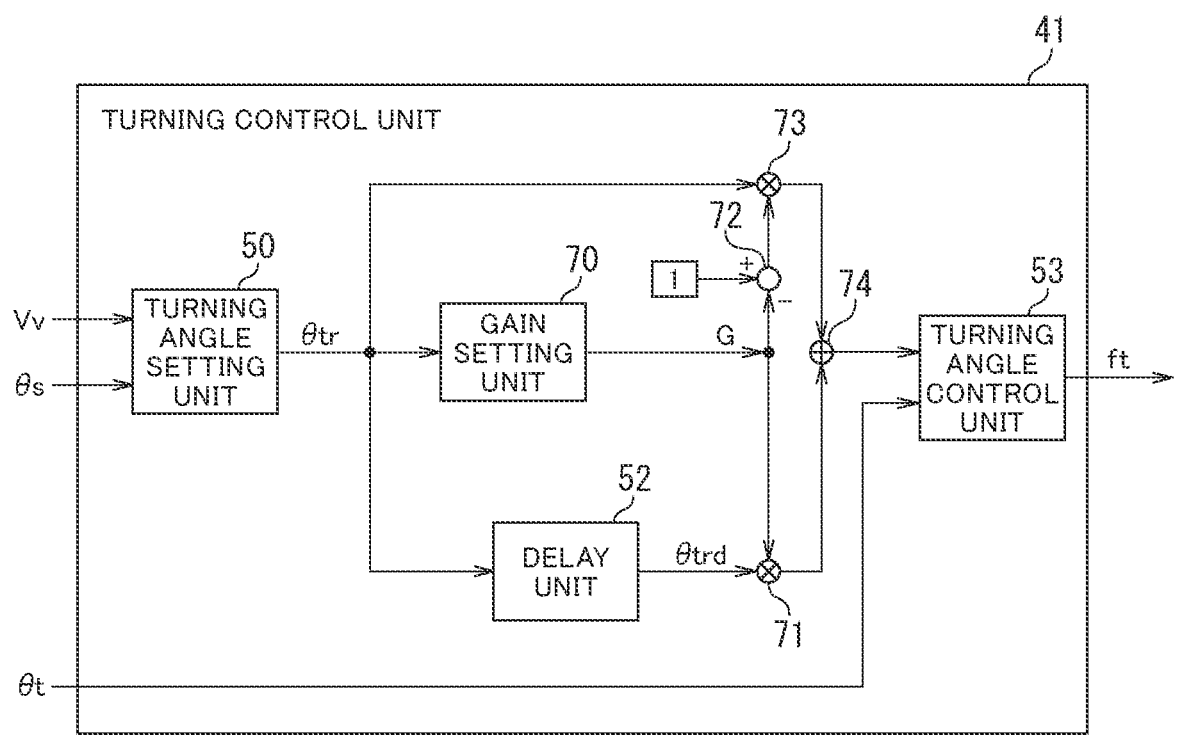
FIG. 8A is a block diagram of an example of a functional configuration of a turning control unit of a third embodiment.

FIG. 8A is a block diagram of an example of a functional configuration of the turning control unit 41 of the third embodiment. The turning control unit 41 of the third embodiment further includes a gain setting unit 70, multipliers 71 and 73, a subtracter 72, and an adder 74. Note that a delay unit 52 may be a phase delay filter (delay filter) or the delay unit 52 of the second embodiment.

The gain setting unit 70 sets a gain G matching the steering angle θs. The gain G is a gain that is not zero when the steering angle θs is less than a predetermined value and has a value of zero when the steering angle θs is greater than or equal to the predetermined value.

For example, the gain setting unit 70 may set the gain G according to a target turning angle θtr that is set based on the steering angle θs. As described above, the target turning angle θtr is a product of the steering angle θs and an angle ratio Ra.

Figure 8B:
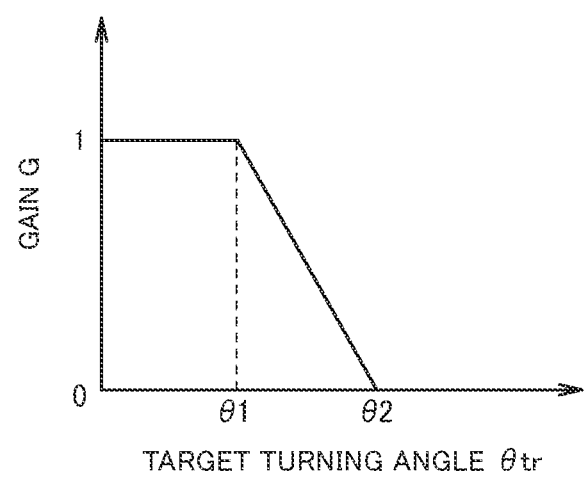
FIG. 8B is an explanatory diagram of an example of a gain G set by a gain setting unit in FIG. 8A.

FIG. 8B is an explanatory diagram of an example of the gain G. The value of the gain G is "1" when the target turning angle θtr is less than or equal to θ1, is "0" when the target turning angle θtr is greater than or equal to θ2, and decreases from "1" to "0" as the target turning angle θtr increases when the target turning angle θtr is greater than θ1 and less than θ2.

The multipliers 71 and 73, the subtracter 72, and the adder 74 calculate a weighted sum (G×θtrd+(1−G)×θtr) of a target turning angle θtrd having a phase delayed by the delay unit 52 and the target turning angle θtr.

A turning angle control unit 53 calculates, based on a difference between the weighted sum (G×θtrd+(1−G)×θtr) and the actual turning angle θt, the turning force command value ft to cause the actual turning angle θt to coincide with the weighted sum (G×θtrd+(1−G)×θtr).

Therefore, when the target turning angle θtr is greater than or equal to θ2, the value of the weighted sum (G×θtrd+(1−G)×θtr) coincides with the target turning angle θtr and phase delay disappears. Thus, phase delay of the turning force command value ft with respect to the steering angle θs does not occur.

On the other hand, since, when the target turning angle θtr is less than θ2, the weighted sum (G×θtrd+(1−G)×θtr) includes a component of the target turning angle θtrd having a phase delayed, the phase is delayed with respect to the steering angle θs. Thus, phase delay of the turning force command value ft with respect to the steering angle θs occurs.

Because of this configuration, it is possible to generate the turning force command value ft in such a manner as to delay the phase of the turning force command value ft with respect to the steering angle θs in a period immediately after the steering angle θs has started to change from a neutral position and not to delay the phase of the turning force command value ft in the other period.

Figure 9A:
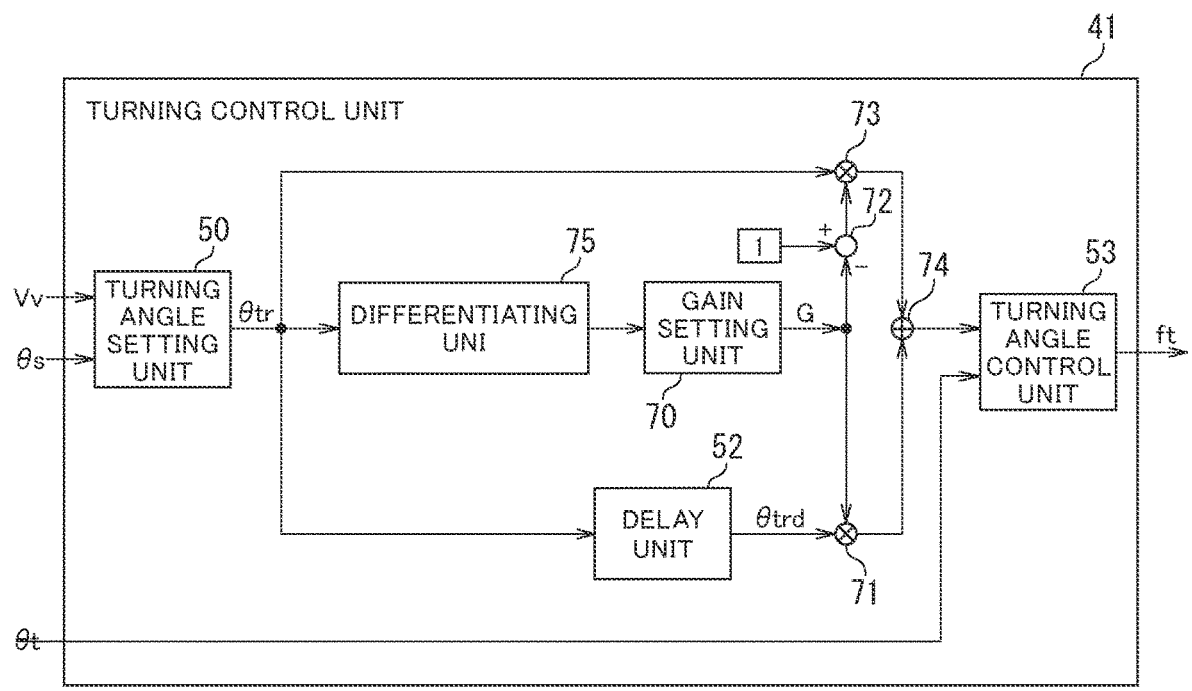
FIG. 9A is a block diagram of an example of a functional configuration of a variation of the turning control unit of the third embodiment.

FIG. 9A is a block diagram of an example of a functional configuration of a first variation of the turning control unit 41 of the third embodiment.

The turning control unit 41 of the first variation delays the phase of the turning force command value ft with respect to the steering angle θs when angular velocity of the steering angle θs is less than a predetermined value and does not delay the phase of the turning force command value ft with respect to the steering angle θs when the angular velocity of the steering angle θs is greater than or equal to the predetermined value.

Because of this configuration, it is possible to delay the phase of the turning force command value ft with respect to the steering angle θs not only immediately after the steering angle θs has started to change from the neutral position but also immediately after the steering angle θs has started to change from a state in which the steering is held at a position other than the neutral position.

The gain setting unit 70 sets a gain G matching the angular velocity of the steering angle θs. For example, the gain setting unit 70 may set a gain G that is not zero when the angular velocity of the steering angle θs is less than a predetermined value and has a value of zero when the angular velocity of the steering angle θs is greater than or equal to the predetermined value.

For example, the gain setting unit 70 may set the gain G according to turning angular velocity ω that is obtained by differentiating the target turning angle θtr.

The turning control unit 41 of the first variation includes a differentiator 75 configured to calculate the turning angular velocity ω by differentiating the target turning angle θtr.

The gain setting unit 70 sets a gain G matching the turning angular velocity ω.

Figure 9B:
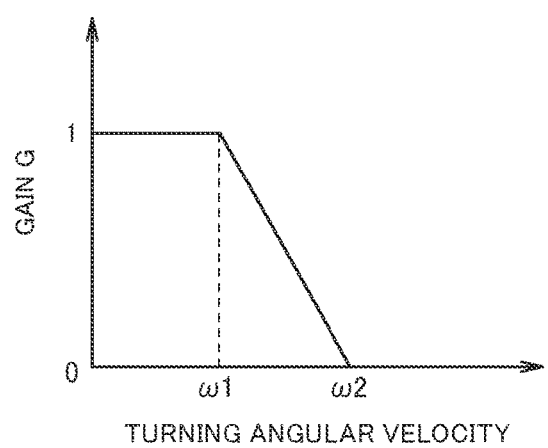
FIG. 9B is an explanatory diagram of an example of a gain G set by a gain setting unit in FIG. 9A.

FIG. 9B is an explanatory diagram of an example of the gain G. The value of the gain G is "1" when the turning angular velocity ω is less than or equal to ω1 and is "0" when the turning angular velocity ω is greater than or equal to ω2.

When the turning angular velocity ω is greater than ω1 and less than ω2, the value of the gain G decreases from "1" to "0" as the turning angular velocity ω increases.

Therefore, when the turning angular velocity ω is greater than or equal to ω2, the value of the weighted sum (G×θtrd+(1−G)×θtr) coincides with the target turning angle θtr and phase delay disappears. Thus, phase delay of the turning force command value ft with respect to the steering angle θs does not occur.

On the other hand, since, when the turning angular velocity ω is less than ω2, the weighted sum (G×θtrd+(1−G)×θtr) includes a component of the target turning angle θtrd having a phase delayed, the phase is delayed with respect to the steering angle θs. Thus, phase delay of the turning force command value ft with respect to the steering angle θs occurs.

Because of this configuration, it is possible to generate the turning force command value ft in such a manner as to delay the phase of the turning force command value ft with respect to the steering angle θs in a period immediately after the steering angle θs has started to change from a state in which the steering wheel 31a is stationary and not to delay the phase of the turning force command value ft in a period while the steering angle θs is changing.

Figure 10A:
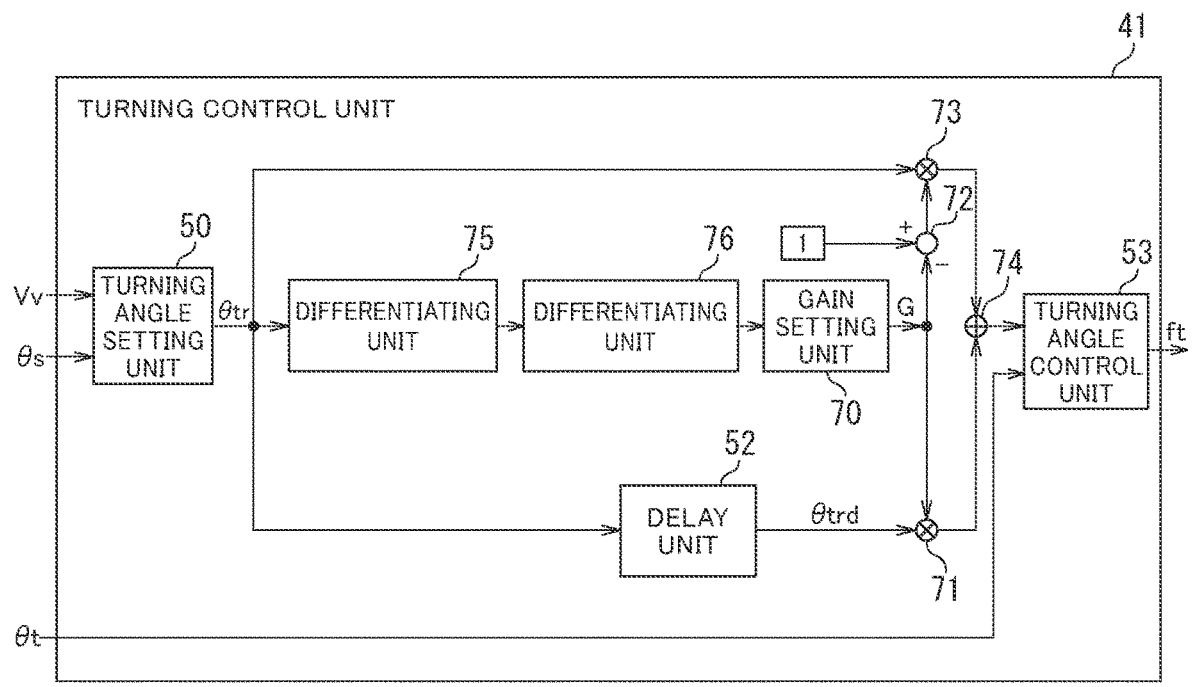
FIG. 10A is a block diagram of an example of a functional configuration of another variation of the turning control unit of the third embodiment.

FIG. 10A is a block diagram of an example of a functional configuration of a second variation of the turning control unit 41 of the third embodiment.

There is a possibility that, even when not in a period immediately after the steering angle θs has started to change, the above-described turning control unit 41 of the first variation delays the phase of the turning force command value ft with respect to the steering angle θs in a period in which a state in which the steering angle θs is changing transitions to a steering holding state in which the steering wheel 31a is stationary. This is because the angular velocity of the steering angle θs becomes small in the period of transition to the steering holding state.

Thus, the turning control unit 41 of the second variation delays the phase of the turning force command value ft with respect to the steering angle θs when angular acceleration of the steering angle θs is less than a predetermined value and does not delay the phase of the turning force command value ft with respect to the steering angle θs when the angular acceleration of the steering angle θs is greater than or equal to the predetermined value.

Because of this configuration, even when the angular velocity of the steering angle θs becomes small in the period of transition to the steering holding state, it is possible to detect the angular acceleration of the steering angle θs and thereby prevent the phase of the turning force command value ft from being delayed.

The gain setting unit 70 sets a gain G matching the angular acceleration of the steering angle θs. For example, the gain setting unit 70 may set a gain G that is not zero when the angular acceleration of the steering angle θs is less than a predetermined value and has a value of zero when the angular acceleration of the steering angle θs is greater than or equal to the predetermined value.

For example, the gain setting unit 70 may set the gain G according to turning angular acceleration α that is obtained by second-order differentiating the target turning angle θtr.

The turning control unit 41 of the second variation includes a differentiator 76 configured to calculate the turning angular acceleration α by differentiating the turning angular velocity ω of the target turning angle θtr.

Figure 10B:
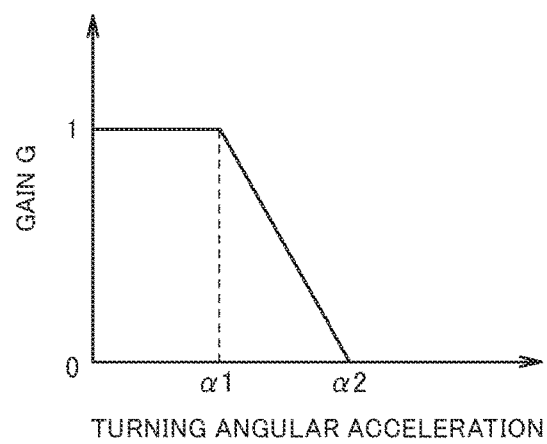
FIG. 10B is an explanatory diagram of an example of a gain G set by a gain setting unit in FIG. 10A.

The gain setting unit 70 sets a gain G matching the turning angular acceleration α. FIG. 10B is an explanatory diagram of an example of the gain G. The value of the gain G is "1"

when the turning angular acceleration α is less than or equal to α1 and is "0" when the turning angular acceleration α is greater than or equal to α2.

When the turning angular acceleration α is greater than α1 and less than α2, the value of the gain G decreases from "1" to "0" as the turning angular acceleration α increases.

Therefore, when the turning angular acceleration α is greater than or equal to α2, the value of the weighted sum (G×θtrd+(1−G)×θtr) coincides with the target turning angle θtr and phase delay disappears. Thus, phase delay of the turning force command value ft with respect to the steering angle θs does not occur.

On the other hand, since, when the turning angular acceleration α is less than α2, the weighted sum (G×θtrd+(1−G)×θtr) includes a component of the target turning angle θtrd having a phase delayed, the phase is delayed with respect to the steering angle θs. Thus, phase delay of the turning force command value ft with respect to the steering angle θs occurs.

Because of this configuration, it is possible to delay the phase of the turning force command value ft with respect to the steering angle θs in an initial period in which the steering angle θs starts to change from a state in which the steering wheel 31a is stationary and the angular acceleration is still small immediately after the steering angle θs has started to change.

In addition, even when the angular velocity of the steering angle θs becomes small in a period in which a state in which the steering angle θs is changing transitions to the steering holding state in which the steering wheel 31a is stationary, it is possible to detect the angular acceleration of the steering angle θs and thereby prevent the phase of the turning force command value ft from being delayed.

Figure 11A:
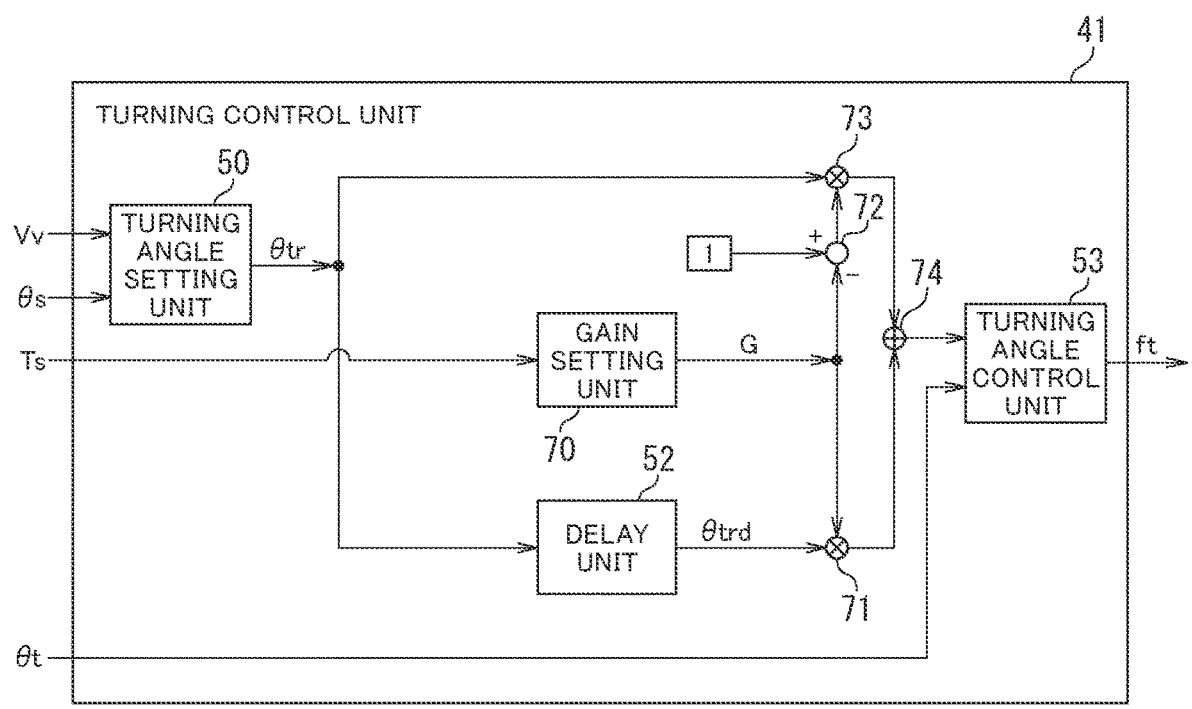
FIG. 11A is a block diagram of an example of a functional configuration of still another variation of the turning control unit of the third embodiment.

FIG. 11A is a block diagram of an example of a functional configuration of a third variation of the turning control unit 41 of the third embodiment.

The turning control unit 41 of the third variation delays the phase of the turning force command value ft with respect to the steering angle θs when steering torque Ts applied to the steering wheel 31a is less than a predetermined value and does not delay the phase of the turning force command value ft with respect to the steering angle θs when the steering torque Ts is greater than or equal to the predetermined value.

The turning control unit 41 of the third variation achieves the same advantageous effects as those of the turning control unit 41 of the second variation.

Figure 11B:
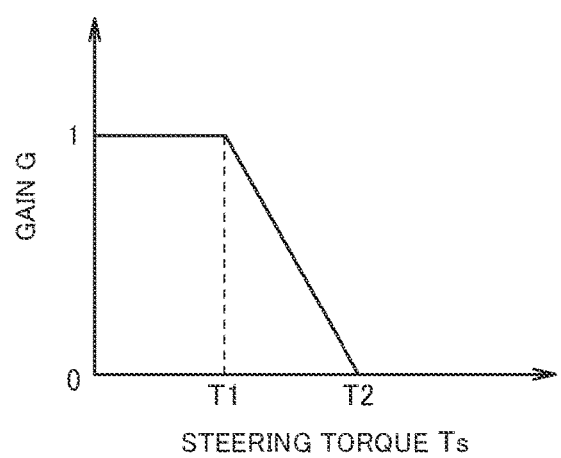
FIG. 11B is an explanatory diagram of an example of a gain G set by a gain setting unit in FIG. 11A.

The gain setting unit 70 sets a gain G matching the steering torque Ts. FIG. 11B is an explanatory diagram of an example of the gain G. The value of the gain G is "1" when the steering torque Ts is less than or equal to T1 and is "0" when the steering torque Ts is greater than or equal to T2.

When the steering torque Ts is greater than T1 and less than T2, the value of the gain G decreases from "1" to "0" as the steering torque Ts increases.

Therefore, when the steering torque Ts is greater than or equal to T2, the value of the weighted sum (G×θtrd+(1−G)×θtr) coincides with the target turning angle θtr and phase delay disappears. Thus, phase delay of the turning force command value ft with respect to the steering angle θs does not occur.

On the other hand, since, when the steering torque Ts is less than T2, the weighted sum (G×θtrd+(1−G)×θtr) includes a component of the target turning angle θtrd having a phase delayed, the phase is delayed with respect to the steering angle θs. Thus, phase delay of the turning force command value ft with respect to the steering angle θs occurs.

Figure 12A:
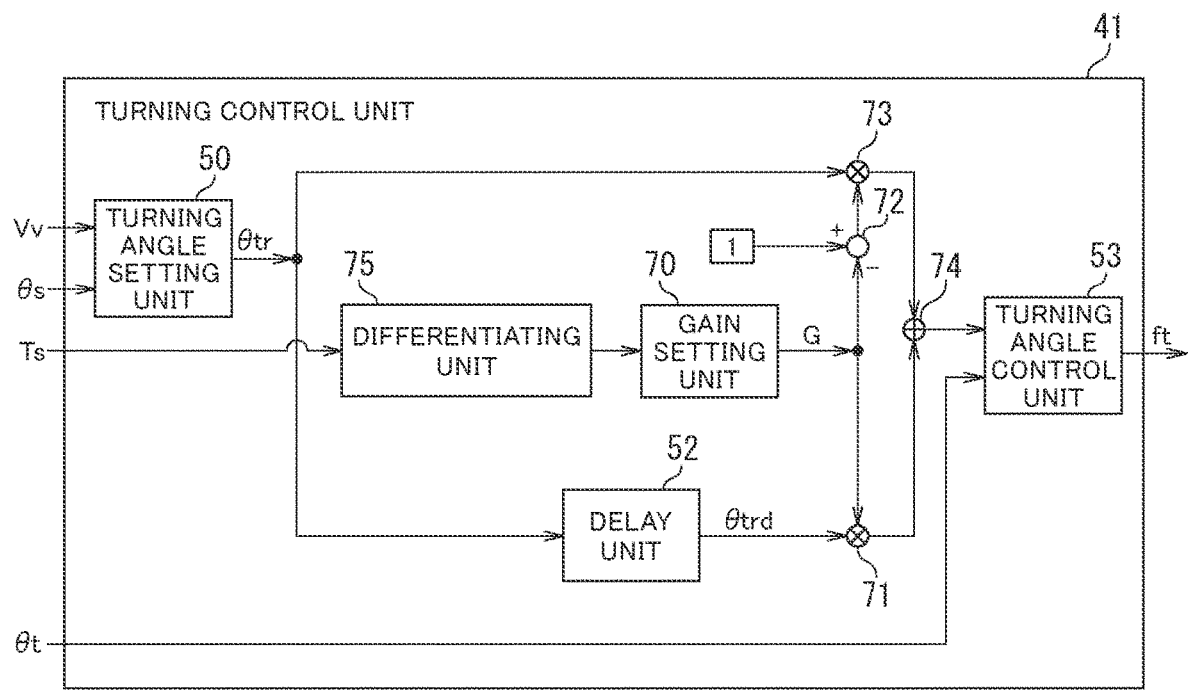
FIG. 12A is a block diagram of an example of a functional configuration of still another variation of the turning control unit of the third embodiment.

FIG. 12A is a block diagram of an example of a functional configuration of a fourth variation of the turning control unit 41 of the third embodiment.

The turning control unit 41 of the fourth variation delays the phase of the turning force command value ft with respect to the steering angle θs when temporal change j of the steering torque Ts is less than a predetermined value and does not delay the phase of the turning force command value ft with respect to the steering angle θs when the temporal change j of the steering torque Ts is greater than or equal to the predetermined value.

The temporal change j of the steering torque Ts may be replaced by steering angular jerk of the steering angle θs.

Because of this configuration, it is possible to delay the phase of the turning force command value ft with respect to the steering angle θs in an initial period in which the steering angle θs starts to change from a state in which the steering wheel 31a is stationary and the steering angular jerk is still small immediately after the steering angle θs has started to change.

In addition, it is possible to, in a period in which a state in which the steering angle θs is changing transitions to the steering holding state in which the steering wheel 31a is stationary, prevent the phase of the turning force command value ft from being delayed until a point in time when the steering angular jerk becomes small immediately before transition to the steering holding state.

The turning control unit 41 of the fourth variation includes a differentiator 75 configured to calculate the temporal change j of the steering torque Ts by differentiating the steering torque Ts.

Figure 12B:
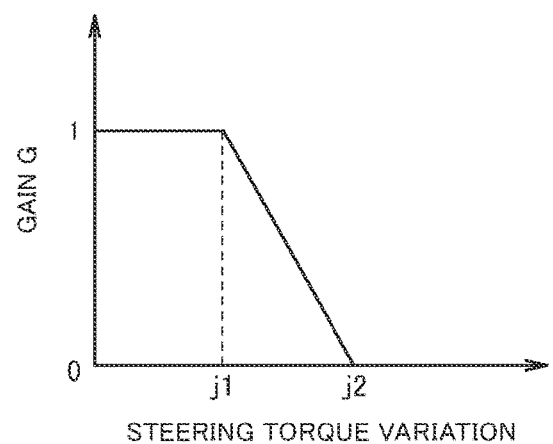
FIG. 12B is an explanatory diagram of an example of a gain G set by a gain setting unit in FIG. 12A.

The gain setting unit 70 sets a gain G matching the temporal change j. FIG. 12B is an explanatory diagram of an example of the gain G. The value of the gain G is "1" when the temporal change j is less than or equal to j1 and is "0" when the temporal change j is greater than or equal to j2.

When the temporal change j is greater than j1 and less than j2, the value of the gain G decreases from "1" to "0" as the temporal change j increases.

Therefore, when the temporal change j is greater than or equal to j2, the value of the weighted sum (G×θtrd+(1−G)×θtr) coincides with the target turning angle θtr and phase delay disappears. Thus, phase delay of the turning force command value ft with respect to the steering angle θs does not occur.

On the other hand, since, when the temporal change j is less than j2, the weighted sum (G×θtrd+(1−G)×θtr) includes a component of the target turning angle θtrd having a phase delayed, the phase is delayed with respect to the steering angle θs. Thus, phase delay of the turning force command value ft with respect to the steering angle θs occurs.

Note that a plurality of any of the first to fourth variations may be combined with one another. For example, the phase of the turning force command value ft may be delayed with respect to the steering angle θs when all of the values of a plurality of variables from among the steering angular velocity, the steering angular acceleration, and the steering angular jerk of the steering angle θs are respectively less than threshold values. The steering angular acceleration and the steering angular jerk of the steering angle θs may be replaced by the steering torque Ts and the temporal change j of the steering torque Ts, respectively.

(Advantageous Effect of Third Embodiment)

The turning control unit 41 delays the phase of the turning force command value ft with respect to the steering angle θs when the steering angle θs, the steering angular velocity, the steering angular acceleration, or the steering angular jerk of the steering angle θs, the steering torque Ts applied to the steering wheel 31a, or the temporal change j of the steering torque Ts is less than a predetermined value.

Because of this configuration, it is possible to delay the phase of the turning force command value ft with respect to the steering angle θs in a period immediately after the turning angle θt has started to change in which a response of vehicle behavior to steering operation becomes fast and to prevent the phase of the turning force command value ft from being delayed in the other period.

Fourth Embodiment

The turning control unit 41 of the above-described first embodiment delays the phase of the turning force command value ft with respect to the steering angle θs by delaying the phase of the target turning angle θtr.

Instead of this configuration, a turning control unit 41 of the fourth embodiment delays a phase of a turning force command value ft with respect to a steering angle θs by delaying a phase of a turning force command value that a turning angle control unit 53 outputs.

This configuration enables the same advantageous effects as those of the turning control unit 41 of the first embodiment to be achieved.

Figure 13:
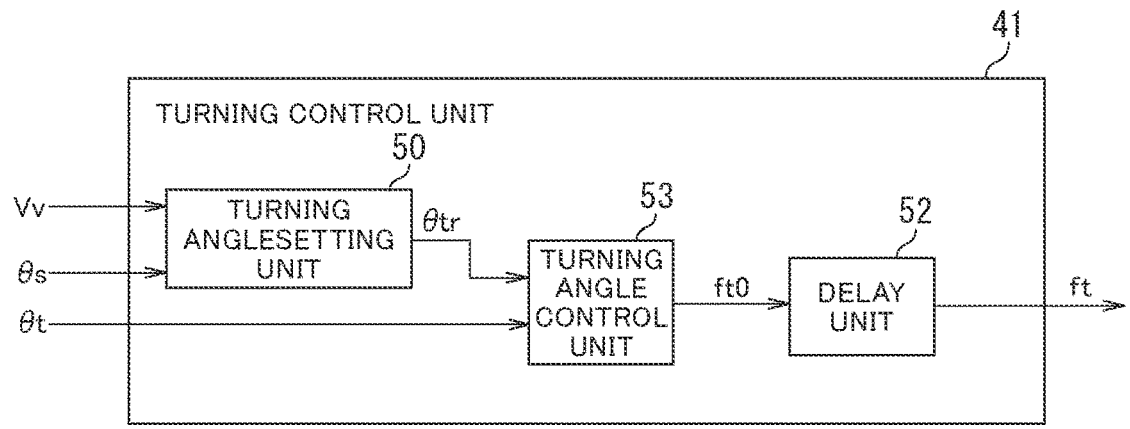
FIG. 13 is a block diagram of an example of a functional configuration of a turning control unit of a fourth embodiment.

FIG. 13 is a block diagram of an example of a functional configuration of the turning control unit 41 of the fourth embodiment.

The turning angle control unit 53 calculates, based on a difference between a target turning angle θtr that a turning angle setting unit 50 set and an actual turning angle θt, a reference turning force command value ft0 to cause the actual turning angle θt to coincide with the target turning angle θtr.

A delay unit 52 delays a phase of the reference turning force command value ft0 that the turning angle control unit 53 outputs and outputs the reference turning force command value ft having a phase delayed as a turning force command value ft. The delay unit 52 may be, for example, a phase delay filter (delay filter).

Figure 14:
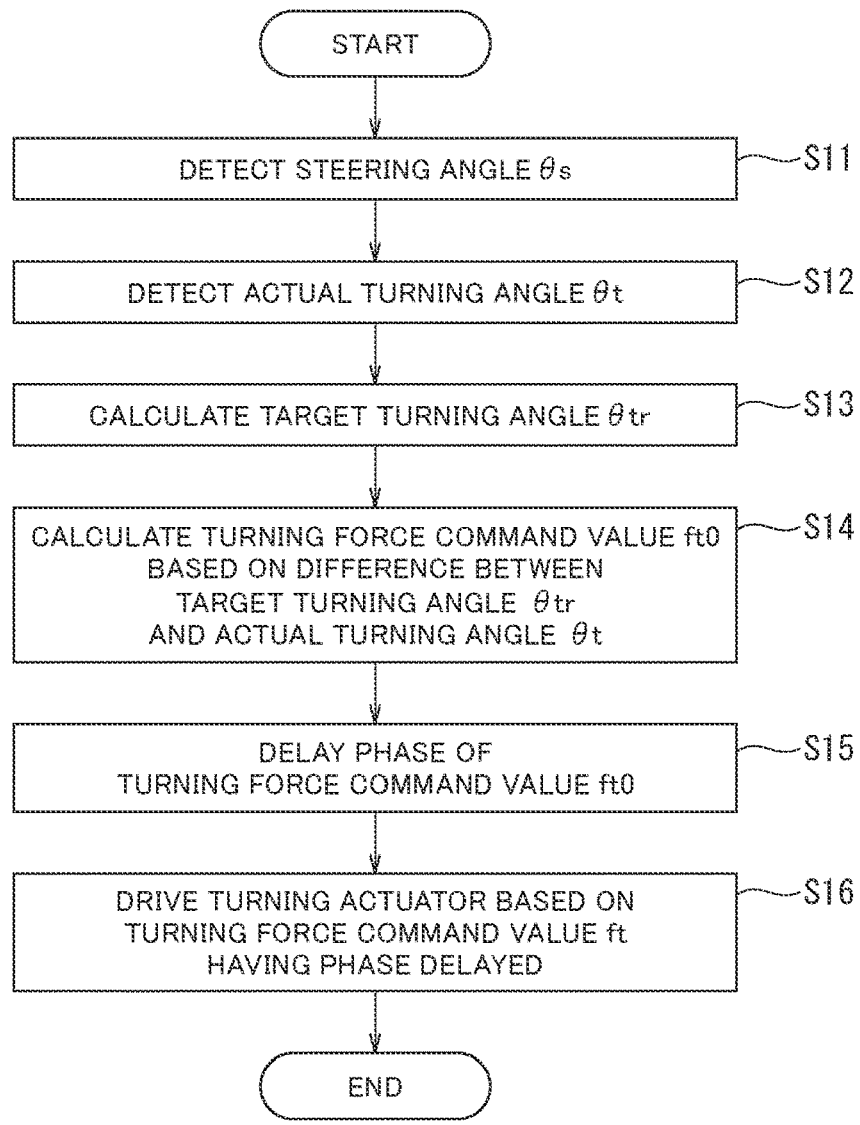
FIG. 14 is a flowchart of an example of a turning method of the fourth embodiment.

Next, an example of a turning method of the fourth embodiment will be described with reference to FIG. 14.

Figure 5:
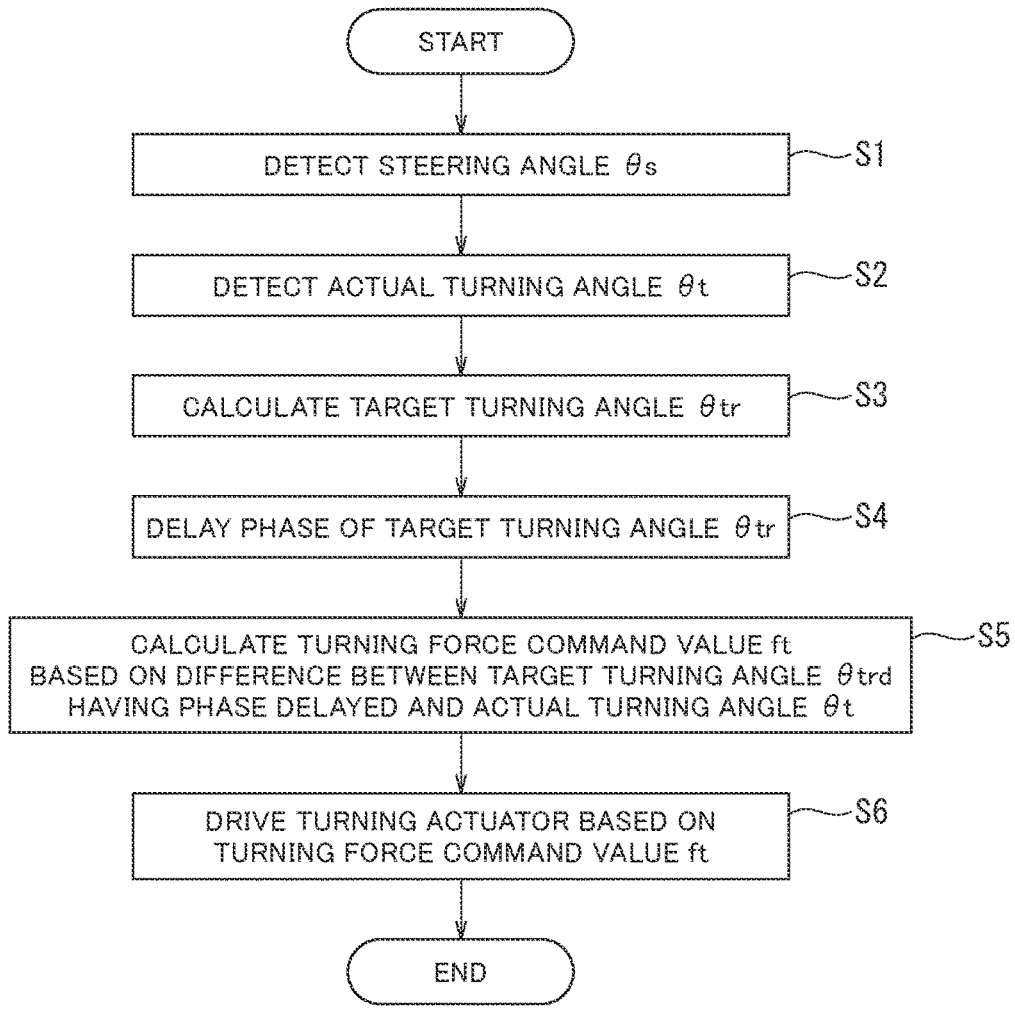
FIG. 5 is a flowchart of an example of a turning method of the first embodiment.

Processing in steps S11 to S13 is the same as the processing in steps S1 to S3 in FIG. 5, respectively.

In step S14, the turning angle control unit 53 calculates, based on a difference between the target turning angle θtr that the turning angle setting unit 50 set and the actual turning angle θt, the reference turning force command value ft0 to cause the actual turning angle θt to coincide with the target turning angle θtr.

In step S15, the delay unit 52 delays the phase of the reference turning force command value ft0 that the turning angle control unit 53 outputs and outputs the turning force command value ft having a phase delayed.

Processing in step S16 is the same as the processing in step S7 in FIG. 5.

Figure 15:
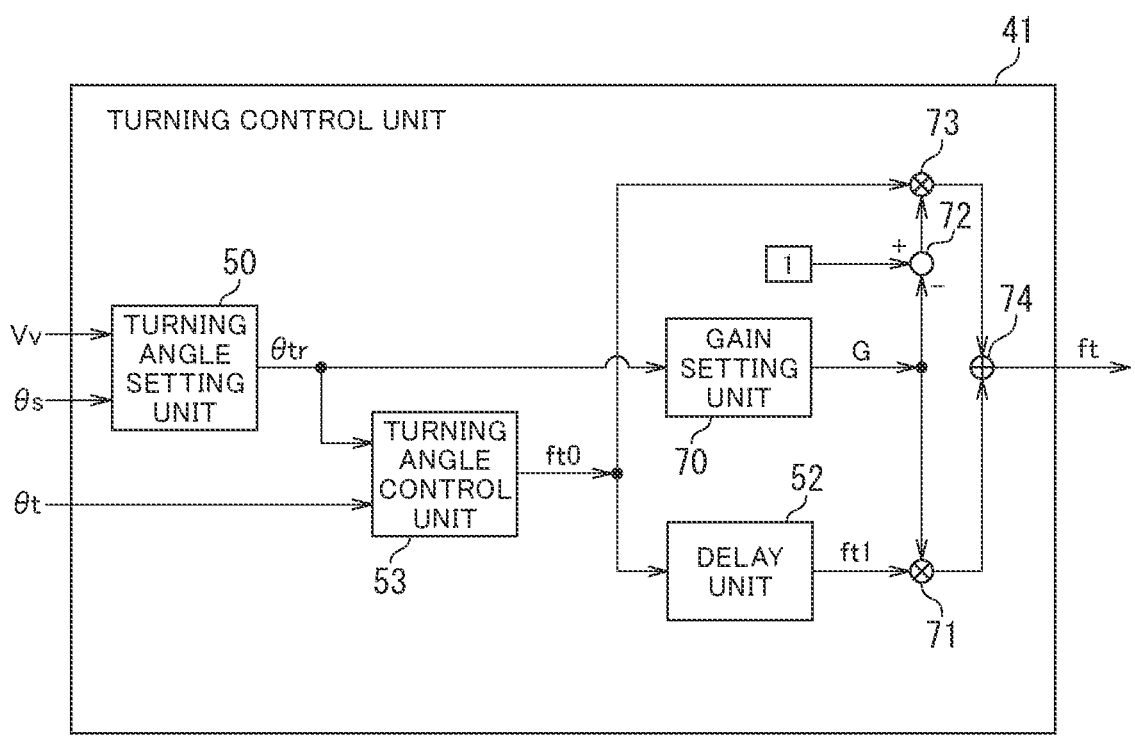
FIG. 15 is a block diagram of an example of a functional configuration of a variation of the turning control unit of the fourth embodiment.

FIG. 15 is a block diagram of an example of a functional configuration of a variation of the turning control unit 41 of the fourth embodiment.

The turning control unit 41 of the fourth embodiment, as with the turning control unit 41 of the third embodiment, delays the phase of the turning force command value ft with respect to the steering angle θs when the steering angle θs is less than a predetermined value and does not delay the phase of the turning force command value ft with respect to the steering angle θs when the steering angle θs is greater than or equal to the predetermined value.

The turning control unit 41 of the variation, as with the turning control unit 41 of the third embodiment, includes a gain setting unit 70, multipliers 71 and 73, a subtracter 72, and an adder 74.

The gain setting unit 70, as with the gain setting unit 70 of the third embodiment, sets a gain G matching the steering angle θs. The gain G is a gain that is not zero when the steering angle θs is less than a predetermined value and has a value of zero when the steering angle θs is greater than or equal to the predetermined value.

The multipliers 71 and 73, the subtracter 72, and the adder 74 calculate a weighted sum (G×ft1+(1−G)×ft0) of a turning force command value ft1 obtained by the delay unit 52 delaying the phase of the reference turning force command value ft0 and the reference turning force command value ft0 as a turning force command value ft.

Therefore, when the steering angle Os is greater than or equal to the predetermined value, the turning force command value ft becomes the reference turning force command value ft0 that does not include phase delay. Thus, phase delay of the turning force command value ft with respect to the steering angle Os does not occur.

On the other hand, when the steering angle Os is less than the predetermined value, the weighted sum (G×ft1+(1−G)×ft0) includes a component of the turning force command value ft1 having a phase delayed. Thus, as with the third embodiment, phase delay of the turning force command value ft with respect to the steering angle θs occurs.

Further, the gain setting unit 70 of the fourth embodiment may, as with the gain setting unit 70 of one of the first to fourth variations of the third embodiment, calculate a gain matching the turning angular velocity o, the turning angular acceleration α, the steering torque Ts, or the temporal change of the steering torque Ts.

Based on this configuration, the turning control unit 41 of the fourth embodiment may be configured not to delay the phase of the turning force command value ft with respect to the steering angle θs when the steering angular velocity, the steering angular acceleration, or the steering angular jerk of the steering angle θs, the steering torque Ts applied to the steering wheel 31a, or the temporal change j of the steering torque Ts is greater than or equal to a predetermined value and to delay the phase of the turning force command value ft with respect to the steering angle θs when the steering angular velocity, the steering angular acceleration, the steering angular jerk of the steering angle, the steering torque Ts, or the temporal change j of the steering force is less than the predetermined value.

(Advantageous Effect of Fourth Embodiment)

The turning control unit 41 may delay the phase of the turning force command value ft with respect to the steering angle θs by delaying the phase of the turning force command value ft that is calculated based on a difference between the actual turning angle θt and the target turning angle θtr.

This configuration enables a response of the vehicle behavior to the steering force that the driver applies to be prevented from becoming fast and a feeling of uneasiness that the driver has to be reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

11 Controller
12 Reaction force actuator
13 First drive circuit
14 Turning actuator
15 Second drive circuit
16 Torque sensor
17 Vehicle velocity sensor
19 Steering angle sensor
20 Processor
21 Storage device
31 Steering unit
31a Steering wheel
31b Column shaft
32 Turning unit
32a Pinion shaft
32b Steering gear
32c Rack gear
32d Steering rack
33 Backup clutch
34 Steered wheel
34FL Left front wheels
34FR Right front wheels
35 Turning angle sensor
40 Reaction force control unit
41 Turning control unit
50 Turning angle setting unit
52 Delay unit
53 Turning angle control unit
60 Gain multiplication unit
61 Delay element
62, 64, 74 Adder
63 Limiter
65, 72 Subtracter
70 Gain setting unit
71, 73 Multiplier
75, 76 Differentiator

The invention claimed is:

1. A turning method for turning a steered wheel of a vehicle comprising:
   detecting a steering angle of a steering wheel;
   detecting an actual turning angle, the actual turning angle being an actual turning angle of the steered wheel;
   calculating a target turning angle of the steered wheel according to the detected steering angle;
   calculating a turning force command value to cause the actual turning angle to coincide with the target turning angle, based on a difference between the actual turning angle and the target turning angle;
   delaying a phase of the target turning angle by adding an integral term of the target turning angle calculated according to the detected steering angle to a proportional term of the target turning angle;
   delaying a phase of the turning force command value with respect to the detected steering angle by delaying the phase of the target turning angle calculated according to the detected steering angle; and
   generating turning force to turn the steered wheel in accordance with the turning force command value having a phase delayed.

2. The turning method according to claim 1, wherein the turning method calculates the integral term by only a variable component of the target turning angle or limits the integral term by a limit value matching the target turning angle.

3. A turning method for turning a steered wheel of a vehicle comprising:
   detecting a steering angle of a steering wheel;
   detecting an actual turning angle, the actual turning angle being an actual turning angle of the steered wheel;
   calculating a target turning angle of the steered wheel according to the detected steering angle;
   calculating a turning force command value to cause the actual turning angle to coincide with the target turning angle, based on a difference between the actual turning angle and the target turning angle;
   delaying a phase of the turning force command value with respect to the detected steering angle when the detected steering angle, steering angular velocity, steering angular acceleration, or steering angular jerk of the steering angle, steering force applied to the steering wheel, or temporal change of the steering force is less than a predetermined value; and
   generating turning force to turn the steered wheel in accordance with the turning force command value having a phase delayed.

4. The turning method according to claim 3, wherein the turning method, by delaying a phase of the target turning angle calculated according to the detected steering angle, delays a phase of the turning force command value with respect to the detected steering angle.

5. The turning method according to claim 3, wherein the turning method, by delaying a phase of the turning force command value calculated based on a difference between the actual turning angle and the target turning angle, delays a phase of the turning force command value with respect to the detected steering angle.

6. The turning method according to claim 4, wherein the turning method, by adding an integral term of the target turning angle calculated according to the detected steering angle to a proportional term of the target turning angle, delays a phase of the target turning angle.

7. The turning method according to claim 6, wherein the turning method calculates the integral term by integrating only a variable component of the target turning angle or limits the integral term by a limit value matching the target turning angle.

8. A turning device configured to turn a steered wheel of a vehicle comprising:
   a first sensor configured to detect a steering angle of a steering wheel;
   a second sensor configured to detect an actual turning angle, the actual turning angle being an actual turning angle of the steered wheel;
   an actuator configured to generate turning force to turn the steered wheel; and
   a controller configured to calculate a target turning angle of the steered wheel according to the steering angle detected by the first sensor and calculate a turning force command value to cause the actual turning angle to coincide with the target turning angle, based on a difference between the actual turning angle and the target turning angle, including a delay means for delaying a phase of the turning force command value with respect to the detected steering angle, and configured to drive the actuator in accordance with the turning force command value having a phase delayed by the delay means, wherein the delay means delays a phase of the target turning angle by adding an integral term of the target turning angle calculated according to the detected steering angle to a proportional term of the target turning angle and delays a phase of the turning force command value with respect to the detected steering angle by delaying the phase of the target turning angle calculated according to the detected steering angle.

9. The turning method according to claim 3, wherein the turning method delays a phase, using a delay filter.

10. A turning device configured to turn a steered wheel of a vehicle comprising:
    a first sensor configured to detect a steering angle of a steering wheel;
    a second sensor configured to detect an actual turning angle, the actual turning angle being an actual turning angle of the steered wheel;
    an actuator configured to generate turning force to turn the steered wheel; and
    a controller configured to calculate a target turning angle of the steered wheel according to the steering angle detected by the first sensor and calculate a turning force command value to cause the actual turning angle to coincide with the target turning angle, based on a difference between the actual turning angle and the target turning angle, including a delay means for delaying a phase of the turning force command value with respect to the detected steering angle when the detected steering angle, steering angular velocity, steering angular acceleration, or steering angular jerk of the steering angle, steering force applied to the steering wheel, or temporal change of the steering force is less than a predetermined value, and configured to drive the actuator in accordance with the turning force command value having a phase delayed by the delay means.

\* \* \* \* \*